United States Patent
Bar Eliyahu et al.

(10) Patent No.: US 12,499,371 B2
(45) Date of Patent: Dec. 16, 2025

(54) GUIDED FEEDBACK LOOP FOR AUTOMATED INFORMATION CATEGORIZATION

(71) Applicant: INTUIT INC., Mountain View, CA (US)

(72) Inventors: Natalie Bar Eliyahu, Azor (IL); Yaakov Tayeb, Stir Hadassa (IL); Noga Noff, Pardes Hanna (IL); Hadar Lackritz, Tel-Aviv (IL); Sigalit Bechler, Bney Zion (IL)

(73) Assignee: INTUIT INC., Mountain View, CA (US)

( * ) Notice: Subject to any disclaimer, the term of this patent is extended or adjusted under 35 U.S.C. 154(b) by 930 days.

(21) Appl. No.: 17/655,820

(22) Filed: Mar. 22, 2022

(65) Prior Publication Data
US 2023/0306279 A1    Sep. 28, 2023

(51) Int. Cl.
*G06N 5/022* (2023.01)
*G06F 16/28* (2019.01)
*G06N 5/01* (2023.01)
*G06N 5/04* (2023.01)

(52) U.S. Cl.
CPC .......... *G06N 5/022* (2013.01); *G06F 16/285* (2019.01); *G06N 5/01* (2023.01); *G06N 5/04* (2013.01)

(58) Field of Classification Search
CPC .......... G06N 5/022; G06N 5/01; G06N 5/04; G06N 20/00; G06F 16/285; G06F 18/41; G06Q 40/12
See application file for complete search history.

(56) References Cited

U.S. PATENT DOCUMENTS

| | | | | |
|---|---|---|---|---|
| 2016/0124963 | A1* | 5/2016 | Barker | G16H 10/20 707/728 |
| 2019/0073916 | A1* | 3/2019 | Allen | G09B 7/00 |
| 2019/0347563 | A1* | 11/2019 | Bruno | G06N 5/022 |
| 2020/0320894 | A1* | 10/2020 | Davidson | G09B 19/00 |
| 2020/0402082 | A1* | 12/2020 | Votava | G06F 16/9536 |

(Continued)

OTHER PUBLICATIONS

Mehta et al. ("A Service-Oriented Human Capital Management Recommendation Platform", 2019) (Year: 2019).*

(Continued)

*Primary Examiner* — Imad Kassim
(74) *Attorney, Agent, or Firm* — Patterson + Sheridan, LLP

(57) ABSTRACT

Aspects of the present disclosure provide techniques for automated categorization of electronic information. Embodiments include providing inputs to a machine learning model based on attributes of an electronic data item. Embodiments include receiving one or more first outputs from the machine learning model based on the inputs. Embodiments include selecting, based on the one or more first outputs, a question from a plurality of questions. Embodiments include providing the question for display via a user interface. Embodiments include receiving an answer to the question via the user interface. Embodiments include providing updated inputs to the machine learning model based on the answer. Embodiments include receiving one or more second outputs from the machine learning model based on the updated inputs. Embodiments include determining a category for the electronic data item based on the one or more second outputs.

14 Claims, 5 Drawing Sheets

(56) References Cited

U.S. PATENT DOCUMENTS

| | | | |
|---|---|---|---|
| 2021/0390385 A1* | 12/2021 | Saleh | G06N 3/084 |
| 2022/0012267 A1* | 1/2022 | Markson | G06F 16/958 |
| 2022/0198337 A1* | 6/2022 | Nguyen | G06F 16/3329 |
| 2022/0366354 A1* | 11/2022 | Maiman | G06Q 10/083 |
| 2024/0281614 A1* | 8/2024 | Gray | G06F 40/30 |

OTHER PUBLICATIONS

Bhide et al. ("Keyword Search over Dynamic Categorized Information", 2019) (Year: 2019).*

Moussa et al. ("iClass: Combining Multiple Multi-Label Classification with Expert Knowledge", 2015) (Year: 2015).*

Settles et al. ("Active Learning Literature Survey", 2010) (Year: 2010).*

* cited by examiner

GUIDED FEEDBACK LOOP FOR AUTOMATED INFORMATION CATEGORIZATION

INTRODUCTION

Aspects of the present disclosure relate to techniques for automatic categorization of electronic information through a guided feedback loop.

BACKGROUND

Every year millions of people, businesses, and organizations around the world use electronic financial management systems, such as electronic accounting systems, to help manage their finances. Electronic accounting systems use accounts for categorization of business transactions. Such electronic accounting systems gather data related to financial transactions of the users. The users can then sort the financial transactions into the various accounts in order to track their expenditures and revenues by category. The users can monitor many or all of their financial transactions and other financial matters from a single electronic accounting system and sort them into the various financial accounts. Such an electronic accounting system can help users save time by eliminating the need to check with several different financial institutions in order to manage their finances. However, existing techniques for categorizing electronic transaction records into accounts, such as presenting each electronic transaction record to a user for manual categorization, can be time consuming, inefficient, and error prone.

What is needed is a solution for improved automated categorization of electronic information such as electronic transaction records.

BRIEF SUMMARY

Certain embodiments provide a method for automated categorization of electronic information. In one embodiment, a method includes: providing inputs to a machine learning model based on attributes of an electronic data item; receiving one or more first outputs from the machine learning model based on the inputs; selecting, based on the one or more first outputs, a question from a plurality of questions; providing the question for display via a user interface; receiving an answer to the question via the user interface; providing updated inputs to the machine learning model based on the answer; receiving one or more second outputs from the machine learning model based on the updated inputs; and determining a category for the electronic data item based on the one or more second outputs.

Other embodiments provide a method for automated categorization of electronic information. In one embodiment, the method comprises: providing inputs to a machine learning model based on attributes of an electronic transaction record; receiving one or more first outputs from the machine learning model based on the inputs; determining, based on the one or more first outputs, that a first confidence score does not exceed a threshold; determining, based on the one or more first outputs, a question related to the electronic transaction record; providing the question for display via a user interface; receiving an answer to the question via the user interface; providing updated inputs to the machine learning model based on the answer; receiving one or more second outputs from the machine learning model based on the updated inputs; determining, based on the one or more second outputs, that a second confidence score exceeds the threshold; and determining a category for the electronic transaction record based on the second confidence score exceeding the threshold.

Other embodiments provide: an apparatus operable, configured, or otherwise adapted to perform the aforementioned method as well as those described elsewhere herein; a non-transitory, computer-readable media comprising instructions that, when executed by a processor of an apparatus, cause the apparatus to perform one or more of the aforementioned methods as well as those described elsewhere herein; a computer program product embodied on a computer-readable storage medium comprising code for performing one or more of the aforementioned methods as well as those described elsewhere herein; and an apparatus comprising means for performing one or more of the aforementioned methods as well as those described elsewhere herein. By way of example, an apparatus may comprise a processing system, a device with a processing system, or processing systems cooperating over one or more networks.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
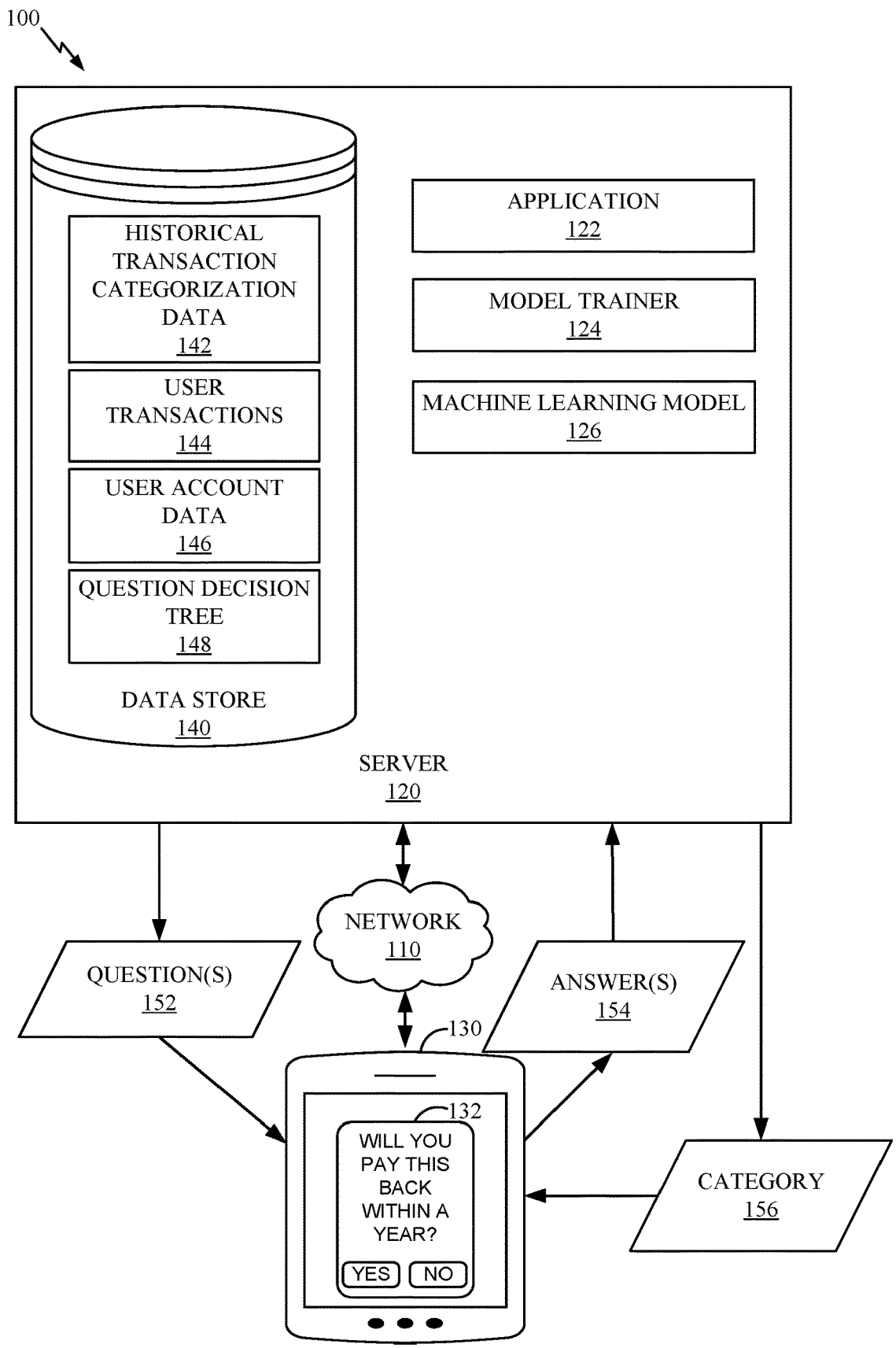
FIG. 1 depicts an example computing environment for automated categorization of electronic information.

Aspects of the present disclosure relate to automated categorization of electronic information, such as electronic transaction records, through a guided feedback loop.

In one example, transactions are categorized into different accounts in a chart of accounts. The chart of accounts includes multiple financial accounts that are used accounting and for generating financial reports. In order to properly assess an entity's finances, transactions should be accurately categorized. Furthermore, various laws and regulations govern financial practices, and compliance with such laws and regulations generally require accurate categorization of transactions.

Because accounts may have large numbers of transactions, it is generally impractical for humans to perform categorization. For example, the amount of transactions that come in over a given time frame may exceed a human's ability to get all of the transactions categorized properly. Accordingly, a computer system may provide a technical solution to the problem by performing automated transaction categorization. Computer-implemented automated transaction categorization methods enhance user experience by reducing the need for tedious manual transaction review and categorization. However, conventional automated transaction categorization techniques often have limited accuracy due to the limited amount of information that is generally available for a given transaction without input from the user. Requesting additional information about transactions from users prior to automatically determining categories for the transactions may improve categorization accuracy, but may be inconvenient for the user and inefficient due to the large amount of information that could potentially be requested.

Embodiments described herein utilize machine learning techniques, including a guided feedback loop, to automatically categorize user transactions into user accounts (e.g., into charts of accounts), such as for financial management purposes. In some cases, historical transaction categorization data of a plurality of users can be used to learn how certain types of transactions tend to be categorized. For example, a machine learning model may be trained, based on historical transaction categorization data of a plurality of users, to output one or more recommended accounts from a user's chart of accounts in response to one or more inputs describing a transaction. Outputs from the machine learning model may include confidence scores indicating likelihoods that a given transaction corresponds to each of a plurality of accounts, which may be used to determine whether to categorize the given transaction into an account of the plurality of accounts.

Account recommendations output by such a machine learning model may have limited accuracy in certain cases, however, such as when limited information is available about a transaction. For example, a model may output similar confidence scores for more than one account and/or may not output a confidence score for any one account that rises above a threshold. Thus, while accounts determined using such a machine learning model may be used to provide recommended categorizations to a user, in many cases they may not be associated with a high enough confidence score to be used for automatically categorizing transactions without manual review.

As described in more detail below with respect to FIGS. 1 and 2, techniques described herein involve, in conjunction with a machine learning model, the use of a guided feedback loop based on a decision tree to efficiently determine information about a transaction that is needed to automatically categorize a transaction with improved confidence. According to certain embodiments, a decision tree includes a flowchart comprising nodes associated with questions and categories, where each question is a binary classifying question that has an answer of either yes or no. At a root node of the tree all categories are possible for a given transaction, and determining an answer to the question at each subsequent node leads to a reduction of the possible categories for the transaction. Leaf nodes of the tree include categories such that a transaction can be confidently assigned to a given category if a leaf node representing the given category is arrived at in the decision tree based on answers to one or more of the binary questions. The decision tree and associated questions may be generated by a subject matter expert familiar with transaction categorization laws, regulations, and/or practices. An examples of a decision tree is described in more detail below with respect to FIG. 3.

Inputs to the machine learning model (e.g., the initial classification model) may include features of transactions that are based on the decision tree. For example, once the category of a transaction is known, the answers to relevant questions in the decision tree may be automatically deduced. Thus, training data for the model may include answers to questions in the decision tree for each of a plurality of historically categorized transactions (e.g., along with other features of the transactions) associated with labels indicating the categories of the transactions. Answers to questions in the decision tree that are irrelevant to a given category and/or are unknown may be assigned a value of null (e.g., as opposed to 1 for yes and 0 for no) in the training data. Training of the machine learning model is described in more detail below with respect to FIG. 1. Once trained, the machine learning model and the decision tree may be used in a recursive manner involving a guided feedback loop in order to determine categories for transactions.

In a particular example, features of a transaction are determined in order to provide inputs to the machine learning model. The features may include, for example, attributes of the transaction (e.g., an amount, description, date, time, parties, and/or the like), attributes of the user for whom the transaction is being categorized (e.g., geographic region, occupation, and/or the like), and any known answers to questions in the decision tree (e.g., with null values for unknown answers). In some cases, answers to certain questions in the decision tree may be inferred based on known information about the transaction (e.g., a description of a transaction may indicate that it relates to a loan, which may answer a question in the decision tree, an amount of the transaction may exceed a threshold, which may answer a question in the decision tree, and/or the like).

The features are provided as inputs to the machine learning model and the machine learning model outputs, for example, confidence scores for each of a plurality of categories (e.g., accounts). In some embodiments, the confidence scores are compared to a threshold to determine if a confidence score for any one category exceeds the threshold. If none of the confidence scores exceed the threshold, then the feedback loop proceeds by selecting a question from the decision tree to present to the user via a user interface. For example, if two categories have confidence scores within a threshold distance of each other and a question in the decision tree would clarify whether the transactions should be assigned to one of the two categories, then that question may be selected for presentation to the user. Once the user answers the question via the user interface, the answer may be used to determine an updated set of features for providing as inputs to the model (e.g., including the newly-received answer with the features that were previously determined). The updated set of features is then provided to the machine learning model, and an updated set of confidence scores may be output by the machine learning model in response. The updated set of confidence scores may then be compared to the threshold to determine whether any category's confidence score exceeds the threshold. If, once again, no confidence score exceeds the threshold, then another question from the decision tree may be selected for presentation via the user interface.

This feedback loop may continue until a confidence score for a category that is output by the machine learning model exceeds the threshold. In most cases, since the questions are selected dynamically based on confidence scores output by the model, a category will be determined after presenting only a small number of questions (e.g., 1-3 questions) to the user. The transaction may then be automatically categorized or, in some embodiments, a category may be recommended to the user accordingly.

Embodiments of the present disclosure constitute a technical improvement with respect to conventional techniques for automatic transaction categorization. For example, by utilizing a guided feedback loop in association with a machine learning model in order to efficiently identify and request information that is most relevant to categorization of a particular transaction, techniques described herein improve accuracy of automatic categorizations (e.g., based on the acquisition of highly relevant information). Furthermore, techniques described herein reduce the amount of user input required for automatic categorization (e.g., by dynamically identifying and requesting only the most relevant information based on confidence scores output by the model). Embodiments of the present disclosure additionally avoid incorrect categorizations (e.g., by selecting a category only when its confidence score exceeds a threshold). The speed with which transactions can be automatically categorized is also improved by techniques described herein (e.g., though the guided feedback loop that efficiently identifies and requests specific information needed for automatic categorization). Embodiments of the present disclosure additionally reduce the amount of physical computing resources required for automatic categorization (e.g., by presenting only the most relevant questions to the user as needed and efficiently converging on an automatic categorization based on relevant features of transactions, rather than presenting a large number of questions and/or processing potentially irrelevant information).

The present disclosure involves a combination of different techniques that provides a benefit beyond the sum of the benefits provided by each individual technique. For example, beyond presenting questions to a user in relation to transactions and using a machine learning model to produce confidence scores for categories, techniques described herein combine the presentation of questions to a user and the use of a machine learning model to produce confidence scores for categories in such a way as to produce a more accurate categorization, and to arrive at the categorization more efficiently (e.g., through a guided feedback loop in which confidence scores output by the model are used to select questions and, in turn, answers received in response to the questions are used to provide updated inputs to the model to produce updated confidence scores).

It is noted that, while embodiments are described herein with respect to particular types of machine learning models and particular types of predictions (e.g., account predictions for transactions), techniques described herein may also be employed in other contexts. For example, techniques described herein involve automatically determining a category (or other attribute) of an electronic data item through the use of a guided feedback loop in which questions related to the electronic data item are iteratively selected from a decision tree based on outputs from a machine learning model and answers received in response to the questions are used to determine updated inputs to the machine learning model. As such, embodiments described herein with respect to account predictions for transactions and particular types of questions are included as examples, and the underlying techniques may be employed for other types of model outputs, with other types of electronic data items, and with other types of questions.

Confidence scores are included as an example, and other types of model outputs may also be used. For example, other measures of accuracy may alternatively be used, such as binary indicators of accuracy, categories of accuracy (e.g., low, medium, high), among others.

Certain embodiments involve the use of confidence scores to guide a workflow of transaction categorization such that transactions with high-confidence account predictions are automatically categorized, bypassing manual review, whereas transactions with low-confidence account predictions are sent to a workflow where more user attention is requested.

Example Computing Environment

FIG. 1 illustrates an example computing environment 100 for automated categorization of electronic information.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 includes an application 122, which generally represents a computing application that a user interacts with over network 110 via client 130. In some embodiments, application 122 is accessed via a user interface associated with client 130. In one example, application 122 comprises a financial management system that is configured to provide financial management services to a plurality of users.

According to one embodiment, application 122 is an electronic financial accounting system that assists users in book-keeping or other financial accounting practices. Additionally, or alternatively, the financial management system can manage one or more of tax return preparation, banking, investments, loans, credit cards, real estate investments, retirement planning, bill pay, and budgeting. Application 122 can be a standalone system that provides financial management services to users. Alternatively, the application 122 can be integrated into other software or service products provided by a service provider. In alternative embodiments, application 122 is not a financial management application, and performs other functions.

In one embodiment, application 122 can assist users in tracking expenditures and revenues by retrieving financial transaction data (e.g., user transactions 144) related to financial transactions of users and by enabling the users to categorize the financial transactions into accounts (e.g., included in user account data 146). Each user can have multiple accounts into which the user's financial transactions can be categorized, which may be referred to as the user's "chart of accounts". Application 122 enables the users to generate and name their various accounts and to use the accounts for their own financial tracking purposes, such as tax preparation and filing.

Model trainer 124 uses historical transaction categorization data 142 to train prediction model 126, such as using supervised learning techniques.

In an example, historical transaction categorization data 142 includes records of categorizations of transactions into accounts that were historically performed by a plurality of users. Training data may be generated based on historical transaction categorization data 142, such as by associating features of transactions with labels indicating accounts into which the transactions were historically categorized (or, in some embodiments, attributes of the accounts). In some embodiments, training of prediction model 126 may be a supervised learning process that involves providing training inputs (e.g., features related to a transaction) as inputs to the model. The model processes the training inputs and outputs classifications (e.g., indicating whether the transaction represented by the features should be categorized into one or more accounts, along with confidence scores for the predictions) with respect to the training inputs. The outputs are compared to labels (e.g., known categorizations) associated with the training inputs to determine the accuracy of the model, and the model is iteratively adjusted until one or more conditions are met. Machine learning model 126 may, for example, comprise one or more neural networks and/or tree-based classifiers. Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Features of a transaction used as inputs to machine learning model 126 (e.g., during training and when the trained model is used to automatically categorize transactions) may include attributes included in an electronic record of the transaction (e.g., an amount, date, time, description, party or parties to the transaction, geographic location, payment method, and/or the like), attributes of a user for whom the transaction is being categorized (e.g., a geographic location, occupation, length of use of the application, and/or the like), answers to questions in a question decision tree (e.g., question decision tree 148) that are known for the transaction, and/or the like. In the context of generating training data, when the category of a transaction is known, answers to at least a subset of questions in the question decision tree can be inferred for the transaction based on the known category, as described in more detail below with respect to FIG. 3.

Once machine learning model 126 is trained, it may be used in a process that involves a guided feedback loop in order to automatically categorize transactions (e.g., represented by user transactions 144). As described in more detail below with respect to FIG. 2, the guided feedback loop generally involves providing features of a given transaction as inputs to the model, receiving confidence scores for a plurality of categories (e.g., accounts) as outputs from the model, comparing the confidence scores to a threshold, and, if no confidence score exceeds the threshold, selecting a question from question decision tree 148 for presentation to the user based on the confidence scores. When an answer to the question is received (e.g., an answer 154 in response to a question 152), the answer is used to generate updated inputs to the model, and the model outputs updated confidence scores for the plurality of categories. The updated confidence scores are then compared to the threshold to determine whether a category can be determined (e.g., if a confidence score for the category exceeds the threshold) or if another question from question decision tree 148 should be selected based on the updated confidence scores. In some cases, a category 156 of the transaction may be provided to client device 130 once a confidence score for the category that is output by the model exceeds the threshold. The category 156 may be provided in the form of an indication of an automated categorization, as a recommended category, and/or the like.

Question decision tree 148, as described in more detail below with respect to FIG. 3, generally represents a binary tree with nodes that correspond to questions and nodes that correspond to categorization decisions. Each node that represents a question branches off in two directions based on the answer to the question (e.g., yes or no). Each node that represents a categorization decision is a leaf node, meaning that these nodes have no "child" nodes in the tree, and a transaction can be automatically categorized if a categorization determination is reached in the decision tree based on answers (for the transaction) to the questions represented in the tree. Question decision tree 148 may, for example, be generated by subject matter experts based on knowledge of laws, regulations, and/or practices with respect to transaction categorization. In some cases, features for a given transaction include values of 0, 1, or null for every question in question decision tree 148, with 0 representing an answer of "no", 1 representing an answer of "yes", and null representing an unknown answer.

Each question 152 that is selected from question decision tree 148 for presentation the user may be transmitted to client device 130 via network 110 and displayed within a user interface on client device 130. For example, a question may be displayed in a user interface control 132 that asks the user "will you pay this back within a year?" and provides one or more controls for answering the question, such as "yes" and "no" buttons. User interface control 132 is included as an example, and other methods of displaying questions to users may be employed. When a user answers a question 152 (e.g., through interaction with user interface control 132), the answer 154 may be transmitted to server 120 via network 110.

Data store 140 generally represents a data storage entity such as a database or repository that stores historical transaction categorization data 142, user transactions 144, user account data 146, and question decision tree 148. Historical transaction categorization data 142 generally includes records of categorizations of transactions into accounts by a plurality of users of application 122. User transactions 144 include the transactions of one or more users (e.g., the user of client 130), which may be received (e.g., downloaded from one or more sources) at the time a given user first uses application 122. User account data 146 includes users' charts of accounts, which also may be received (e.g., via user input) at the time a given user first uses application 122. User transactions 144 and user account data 146 may be updated over time as new transactions and new accounts are received for a given user. Similarly, historical transaction categorization data 142 may be updated over time as categorizations of transactions are made and confirmed (e.g., by users and/or subject matter experts). Question decision tree 148 may be representative of a plurality of question decision trees that relate to different types of transactions. For example, one question decision tree may relate to transactions in which money is received, as described in more detail below with respect to FIG. 3, while another question decision tree may relate to transactions in which money is paid. In other embodiments, a single question decision tree may include all types of transactions (e.g., including nodes that correspond to questions differentiating between different transaction types).

Client 130 generally represents a computing device such as a mobile phone, laptop or desktop computer, tablet computer, or the like. Client 130 is used to access application 122 over network 110, such as via a user interface associated with client 130. In alternative embodiments, application 122 (and, in some embodiments model trainer 124, machine learning model 126, and/or data store 140) is located directly on client 130 or on one or more separate devices.

Figure 2:
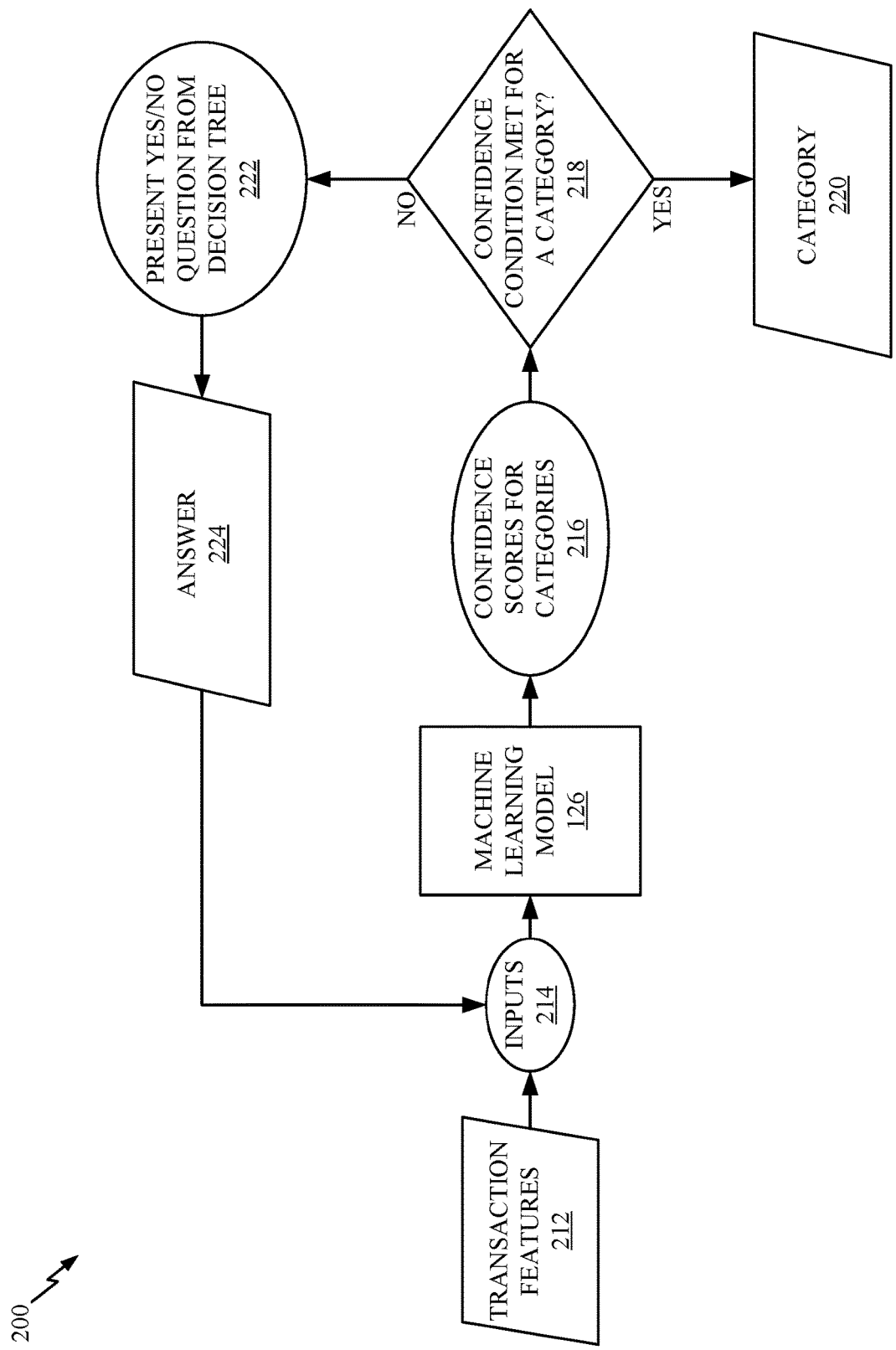
FIG. 2 depicts an example of a guided feedback loop for automated categorization of electronic information.

Example Guided Feedback Loop for Automated Categorization of Electronic Information FIG. 2 depicts an example process 200 including a guided feedback loop for automated categorization of electronic information. Process 200 includes machine learning model 126 of FIG. 1. For example, process 200 may be implemented for determining a category, such as an account from a user's chart of accounts, for a transaction.

Transaction features 212 of the transaction are used to provide inputs 214 to machine learning model 126. For instance, transaction features 212 may represent features of the transaction that are known prior to presenting any questions to the user, and may include null values for some or all questions in a question decision tree (e.g., for questions for which answers cannot be inferred based on other known information about the transaction).

Machine learning model 126 outputs confidence scores 216 for each of a plurality of possible categories for the transaction represented by transaction features 212. A confidence score 216 generally represents a level of confidence that a given category is appropriate for the transaction. Confidence scores 216 may be normalized values (e.g., between 0 and 1), and the sum of all of confidence scores 216 may be 1.

At step 218, it is determined whether a confidence condition has been met for any category. The confidence condition may comprise, for example, whether a confidence score for a given category exceeds a threshold.

If the confidence condition is met for a category, then the transaction may be automatically categorized into the category 220 (or the category 220 may be recommended to the user, and the user may determine whether to categorize the transaction into the category 220).

If the confidence condition is not met for any category, then the guided feedback loop proceeds to step 222, where a yes/no question from the question decision tree is selected based on confidence scores 216 and presented to the user. For example, confidence scores 216 may be used to determine which one or more categories are most likely, and a question from the question decision tree that relates to these one or more categories may be selected. For example, if a confidence score for the category of "long term liability" is 0.5 and a confidence score for the category of "other current liability" is 0.3, but neither of these confidence scores exceeds a threshold indicated by the confidence condition (e.g., a threshold of 0.8), then a question that distinguishes between these two categories may be selected. An example of such as question is described below with respect to FIG. 3, and may be "will you pay this back within a year?" or another similar question. In certain embodiments, categories are mapped to questions via the question decision tree.

The question may be presented to the user via a user interface, and an answer 224 to the question may be received via the user interface. Answer 224 may indicate an answer of "yes" or "no" with respect to the question selected and presented at step 222. In alternative embodiments, the question may have more than two possible answers (e.g., the question may not be binary, and answers other than "yes" or "no" may be possible, and may be associated with different branches in the question decision tree). Answer 224 is then used to generate updated inputs 214 for machine learning model 126. For example, the updated inputs 214 may include all of transaction features 212 along with a new feature that represents answer 224 (e.g., a value for the question may be updated from null to "1" or "0" based on answer 224). The updated inputs 214 are provided to machine learning model 126, and machine learning model 126 outputs updated confidence scores 216.

The updated confidence scores 216 are then compared to the confidence condition at step 218 to determine whether any category meets the confidence condition. If a category meets the confidence condition based on updated confidence scores 216 (e.g., if the category of "long term liability" has an updated confidence score of 0.8 or higher), then the transaction may be automatically categorized into the category 220 (or the category 220 may be recommended to the user). Otherwise, the guided feedback loop continues at step 222 with the selection and presentation of another question from the question decision tree based on updated confidence scores 216.

Figure 3:
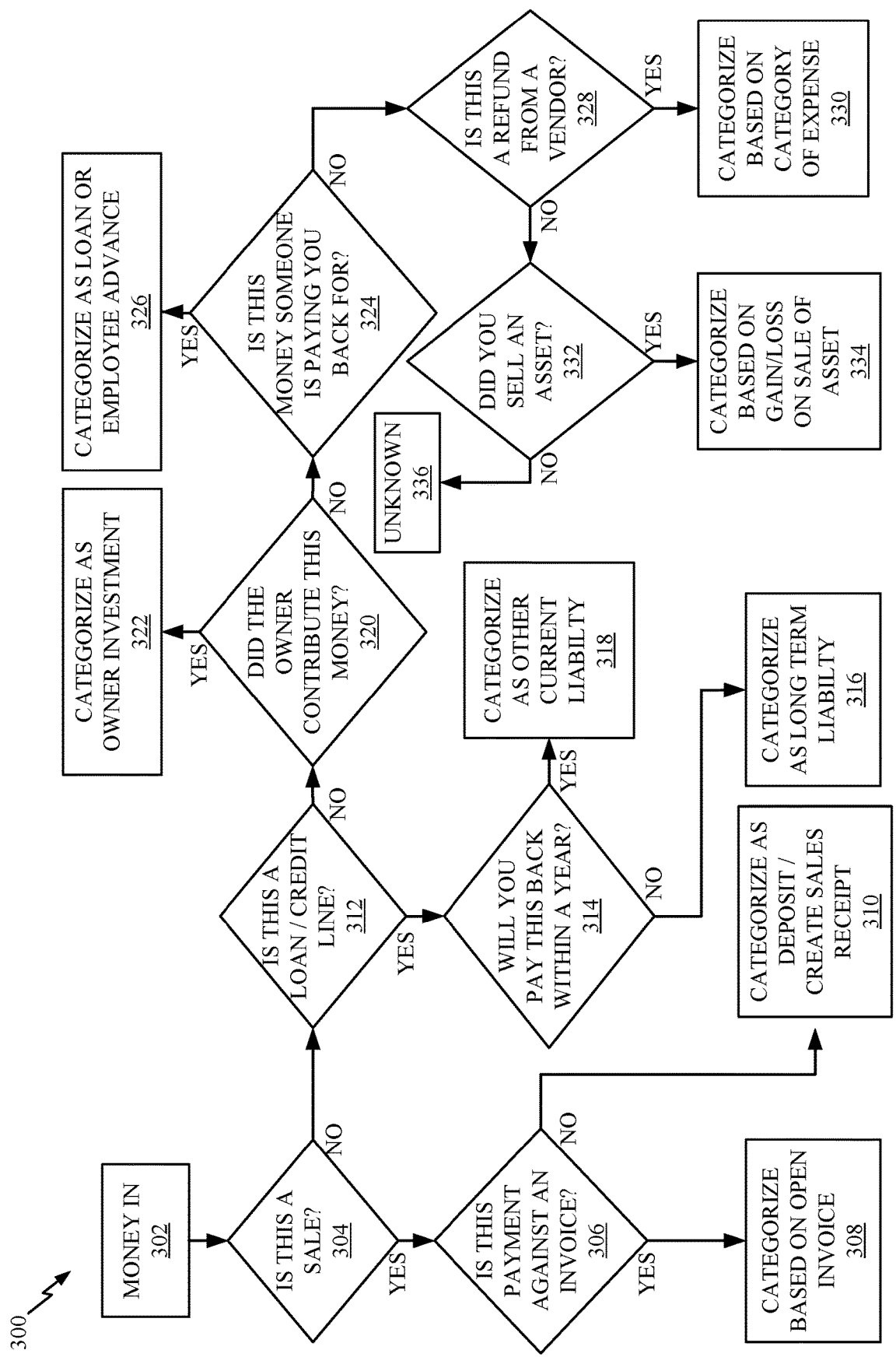
FIG. 3 depicts an example decision tree comprising questions for a guided feedback loop for automated categorization of electronic information.

Example Decision Trees for a Guided Feedback Loop for Automated Categorization of Electronic Information FIG. 3 is an illustration 300 of an example decision tree comprising questions for a guided feedback loop for automated categorization of electronic information. Illustration 300 may, for example, correspond to question decision tree 148 of FIG. 1.

As indicated in box 302, illustration 300 relates to a transaction that includes "money in", which may be characterized as a credit transaction rather than a debit transaction.

The decision tree begins at node 304, which corresponds to the question "is this a sale?", and branches off to nodes 306 and 312 depending on whether the answer to the question is yes or no. If the answer at node 304 is yes, the decision tree proceeds to node 306. If the answer at node 304 is no, the decision tree proceeds to node 312.

Node 306 corresponds to the question "is this payment against an invoice?", and branches off to nodes 308 and 310. If the answer at node 306 is yes, the decision tree proceeds to node 308. If the answer at node 306 is no, the decision tree proceeds to node 310.

Node 308 corresponds to a categorization decision, and indicates that the transaction should be categorized based on an open invoice. For example, the user may be provided with a list of invoices in order to receive a selection of the appropriate invoice (or the invoice may be automatically selected based on attributes of the transaction), and the transaction may be categorized into an invoice account, and (in some embodiments) associated with the invoice.

Node 310 corresponds to a categorization decision, and indicates that the transaction should be categorized as a deposit and a sales receipt should be created. For example, the transaction may be categorized into a deposit account, and a sales receipt may be created based on the transaction (or the user may be prompted to create a sales receipt for the transaction).

Node 312 corresponds to the question "is this a loan/credit line?". If the answer at node 312 is yes, the decision tree proceeds to node 314. If the answer at node 312 is no, the decision tree proceeds to node 320.

Node 314 corresponds to the question "will you pay this back within a year?". If the answer at node 314 is yes, the decision tree proceeds to node 318. If the answer at node 314 is no, the decision tree proceeds to node 316.

Node 316 corresponds to a categorization decision, and indicates that the transaction should be categorized as a long term liability.

Node 318 corresponds to a categorization decision, and indicates that the transaction should be categorized as another current liability.

Node 320 corresponds to the question "did the owner contribute this money?". If the answer at node 320 is yes, the decision tree proceeds to node 322. If the answer at node 320 is no, the decision tree proceeds to node 324.

Node 322 corresponds to a categorization decision, and indicates that the transaction should be categorized as an owner investment.

Node 324 corresponds to the question "is this money someone is paying you back for?". If the answer at node 324 is yes, the decision tree proceeds to node 326. If the answer at node 324 is no, the decision tree proceeds to node 328.

Node 326 corresponds to a categorization decision, and indicates that the transaction should be categorized as a loan or employee advance.

Node 328 corresponds to the question "is this a refund from a vendor?". If the answer at node 328 is yes, the decision tree proceeds to node 330. If the answer at node 328 is no, the decision tree proceeds to node 332.

Node 330 corresponds to a categorization decision, and indicates that the transaction should be categorized based on a category of the expense for which the transaction is a refund (e.g., the expense may be determine based on input from the user or automatically identified based on attributes of the transaction).

Node 332 corresponds to the question "did you sell an asset?". If the answer at node 332 is yes, the decision tree proceeds to node 334. If the answer at node 332 is no, the decision tree proceeds to node 336.

Node 334 corresponds to a categorization decision, and indicates that the transaction should be categorized based on a gain or loss on the sale of an asset.

Node 336 corresponds to a categorization decision, and indicates that the transaction category is unknown (e.g., the user may need to manually categorize the transaction).

The decision tree and questions depicted in illustration 300 are included as an example, and other types of decision trees and questions are possible. For example, in other embodiments a non-binary question decision tree may be used. Furthermore, as the questions in the decision tree are used to determine input features for a machine learning model, the categorization decisions at leaf nodes may not be directly used to automatically categorize transactions. For example, the leaf nodes may be used to determine which questions to ask a user in order to gain information relevant to particular categories that have high confidence scores output by the model, and the outputs from the model may be used to determine whether to automatically categorize a transaction into a given category.

For instance, if confidence scores output by the model for a transaction indicate that the transaction may potentially be categorized as payment of an invoice, as a deposit not associated with an invoice, or as a long term liability, but none of the confidence scores exceed a threshold, then the question at node 304 (e.g., "is this a sale?") may be presented to the user (e.g., because the decision tree indicates that this question would distinguish among these potential categories). If the user answers "yes", then the category of long term liability is ruled out. Updated inputs are provided to the model based on the answer, and updated confidence scores are output by the model. If the updated confidence scores output by the model indicate that the transaction may still potentially be categorized as payment of an invoice or as a deposit not associated with an invoice, then the question at node 306 (e.g., "is this payment against an invoice?") may be presented to the user (e.g., because the decision tree indicates that this question would distinguish among these potential categories). Updated inputs are then provided to the model based on the answer, and further updated confidence scores output by the model will likely include a confidence score that exceeds a threshold for either payment of an invoice or a deposit not associated with an invoice.

Example Operations for Automated Categorization of Electronic Information

Figure 4:
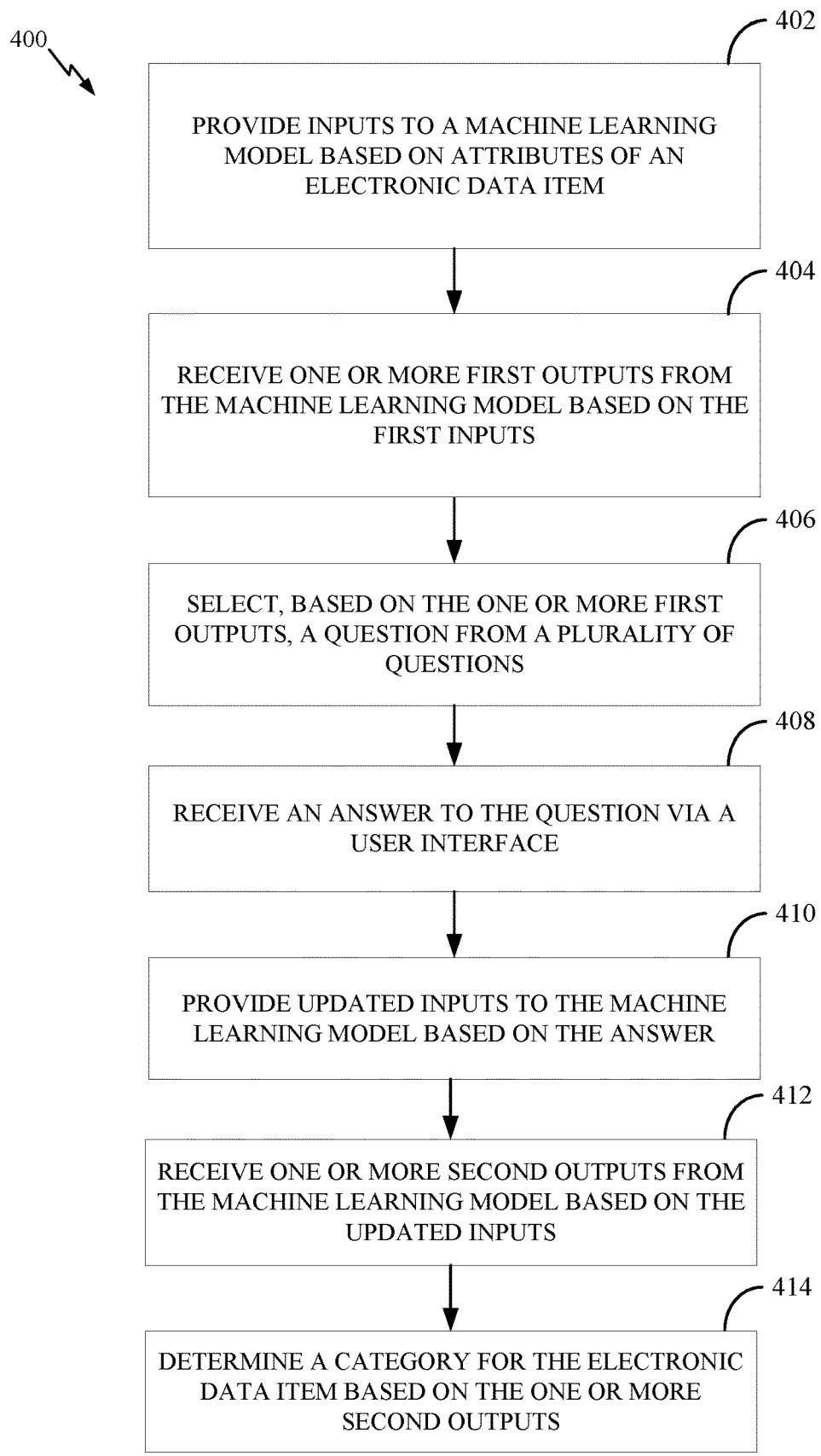
FIG. 4 depicts example operations for automated categorization of electronic information.

FIG. 4 depicts example operations 400 for automated categorization of electronic information. For example, operations 400 may be performed by one or more components of server 120 and/or client 130 of FIG. 1.

Operations 400 begin at step 402, with providing inputs to a machine learning model based on attributes of an electronic data item. The electronic data item may be, for example, an electronic transaction record. In certain embodiments, the machine learning model has been trained based on respective attributes of historically categorized electronic data items of a plurality of users.

Operations 400 continue at step 404, with receiving one or more first outputs from the machine learning model based on the first inputs. Some embodiments further comprise determining, based on the one or more first outputs, that a categorization confidence condition has not been satisfied, such as determining that a first confidence score does not exceed a threshold.

Operations 400 continue at step 406, with selecting, based on the one or more first outputs, a question from a plurality of questions. The plurality of questions may be associated with nodes of a decision tree.

Operations 400 continue at step 408, with receiving an answer to the question via a user interface.

Operations 400 continue at step 410, with providing updated inputs to the machine learning model based on the answer.

Operations 400 continue at step 412, with receiving one or more second outputs from the machine learning model based on the updated inputs. Some embodiments further comprise determining, based on the one or more second outputs, that the categorization confidence condition has been satisfied. For example, determining the category for the electronic data item may be based on the categorization confidence condition being satisfied, such as a second confidence score exceeding the threshold.

Operations 400 continue at step 414, with determining a category for the electronic data item based on the one or more second outputs. The category may be, for example, an account in a chart of accounts associated with a user. Some embodiments further comprise automatically categorizing the electronic data item based on the category for the electronic data item or providing a recommendation of the category of the electronic data item for display via the user interface.

Example Computing Systems

Figure 5A:
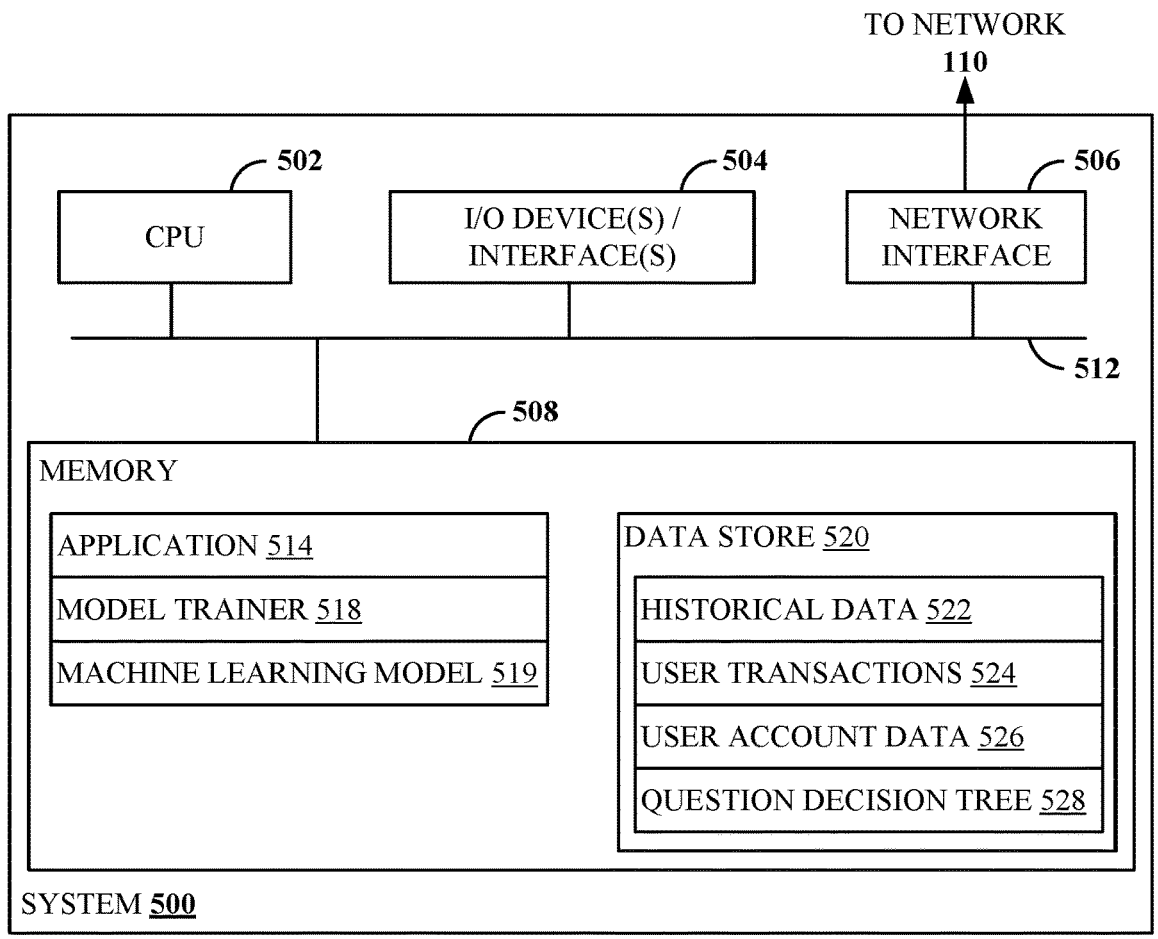
FIGS. 5A and 5B depict example processing systems for automated categorization of electronic information.

FIG. 5A illustrates an example system 500 with which embodiments of the present disclosure may be implemented. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110 (e.g., which may be network 110 of FIG. 1). It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, model trainer 518, and machine learning model 519, which may be representative of application 122, model trainer 124, machine learning model 126 of FIG. 1. Memory 508 further comprises data store 520, which may be representative of data store 140 of FIG. 1. While data store 520 is depicted in local storage of system 500, it is noted that data store 520 may also be located remotely (e.g., at a location accessible over a network, such as the Internet). Data store 520 includes historical data 522, user transactions 524, user account data 526, and question decision tree 528, which may be representative of historical transaction categorization data 142, user transactions 144, user account data 146, and question decision tree 148 of FIG. 1.

Figure 5B:
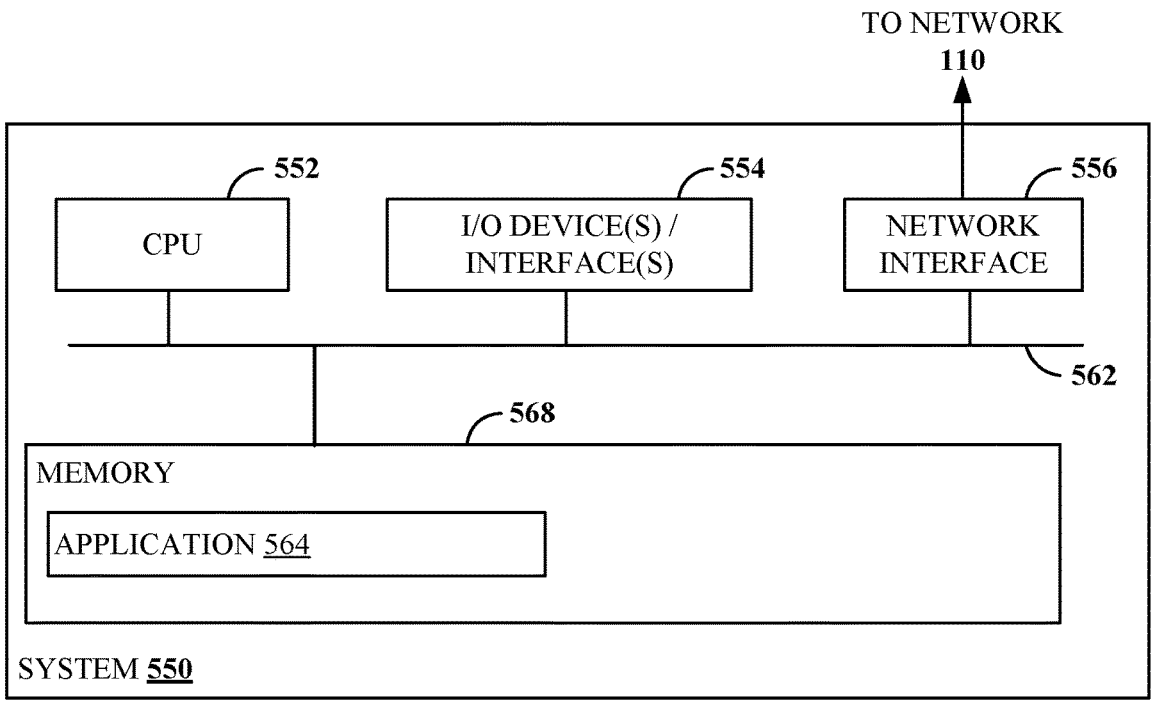

FIG. 5B illustrates another example system 550 with which embodiments of the present disclosure may be implemented. For example, system 550 may be representative of client 130 of FIG. 1.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, and an interconnect 552. It is contemplated that one or more components of system 550 may be located remotely and accessed via a network 110 (e.g., which may be network 110 of FIG. 1). It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, and memory 658. CPU 552 is included to be representative of a single CPU, multiple CPUs, a single CPU having multiple processing cores, and other arrangements.

Additionally, the memory 558 is included to be representative of a random access memory. In some embodiments, memory 558 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 558 includes an application 564, which may be representative of a client-side component corresponding to the server-side application 514 of FIG. 5A. For example, application 564 may comprise a user interface through which a user of system 550 interacts with application 514 of FIG. 5A. In alternative embodiments, application 514 is a standalone application that performs behavior prediction as described herein.

Example Clauses

Clause 1: A method for automated categorization of electronic information, comprising: providing inputs to a machine learning model based on attributes of an electronic data item; receiving one or more first outputs from the machine learning model based on the inputs; selecting, based on the one or more first outputs, a question from a plurality of questions; providing the question for display via a user interface; receiving an answer to the question via the user interface; providing updated inputs to the machine learning model based on the answer; receiving one or more second outputs from the machine learning model based on the updated inputs; and determining a category for the electronic data item based on the one or more second outputs.

Clause 2: The method of Clause 1, further comprising determining, based on the one or more first outputs, that a categorization confidence condition has not been satisfied.

Clause 3: The method of Clause 2, further comprising determining, based on the one or more second outputs, that the categorization confidence condition has been satisfied, wherein determining the category for the electronic data item is based on the categorization confidence condition being satisfied.

Clause 4: The method of any one of Clause 1-3, wherein the machine learning model has been trained based on respective attributes of historically categorized electronic data items of a plurality of users.

Clause 5: The method of any one of Clause 1-4, wherein the plurality of questions are associated with nodes of a decision tree.

Clause 6: The method of any one of Clause 1-5, further comprising automatically categorizing the electronic data item based on the category for the electronic data item.

Clause 7: The method of any one of Clause 1-6, further comprising providing a recommendation of the category of the electronic data item for display via the user interface.

Clause 8: A method for automated categorization of electronic transaction records, comprising: providing inputs to a machine learning model based on attributes of an electronic transaction record; receiving one or more first outputs from the machine learning model based on the inputs; determining, based on the one or more first outputs, that a first confidence score does not exceed a threshold; determining, based on the one or more first outputs, a question related to the electronic transaction record; providing the question for display via a user interface; receiving an answer to the question via the user interface; providing updated inputs to the machine learning model based on the answer; receiving one or more second outputs from the machine learning model based on the updated inputs; determining, based on the one or more second outputs, that a second confidence score exceeds the threshold; and determining a category for the electronic transaction record based on the second confidence score exceeding the threshold.

Clause 9: The method of Clause 8, wherein the category comprises an account in a chart of accounts associated with a user.

Clause 10: The method of any one of Clause 8-9, wherein the machine learning model has been trained based on respective attributes of historically categorized electronic transaction records of a plurality of users.

Clause 11: The method of any one of Clause 8-10, wherein the question is associated with a node of a decision tree.

Clause 12: The method of any one of Clause 8-11, further comprising automatically categorizing the electronic transaction record based on the category for the electronic transaction record.

Clause 13: The method of any one of Clause 8-12, further comprising providing a recommendation of the category of the electronic transaction record for display via the user interface.

Clause 14: A system, comprising: one or more processors; and a memory comprising instructions that, when executed by the one or more processors, cause the system to: providing inputs to a machine learning model based on attributes of an electronic data item; receiving one or more first outputs from the machine learning model based on the inputs; selecting, based on the one or more first outputs, a question from a plurality of questions; providing the question for display via a user interface; receiving an answer to the question via the user interface; providing updated inputs to the machine learning model based on the answer; receiving one or more second outputs from the machine learning model based on the updated inputs; and determining a category for the electronic data item based on the one or more second outputs.

Clause 15: The system of Clause 14, wherein the instructions, when executed by the one or more processors, further cause the system to determine, based on the one or more first outputs, that a categorization confidence condition has not been satisfied.

Clause 16: The system of Clause 15, wherein the instructions, when executed by the one or more processors, further cause the system to determine, based on the one or more second outputs, that the categorization confidence condition has been satisfied, wherein determining the category for the electronic data item is based on the categorization confidence condition being satisfied.

Clause 17: The system of any one of Clause 14-16, wherein the machine learning model has been trained based on respective attributes of historically categorized electronic data items of a plurality of users.

Clause 18: The system of any one of Clause 14-17, wherein the plurality of questions are associated with nodes of a decision tree.

Clause 19: The system of any one of Clause 14-18, wherein the instructions, when executed by the one or more processors, further cause the system to automatically categorize the electronic data item based on the category for the electronic data item.

Clause 20: The system of any one of Clause 14-19, wherein the instructions, when executed by the one or more processors, further cause the system to provide a recommendation of the category of the electronic data item for display via the user interface.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated categorization of electronic information, comprising:
    providing, by a computing application, inputs to a machine learning model based on attributes of an electronic data item, wherein the machine learning model is a neural network trained through a supervised learning process comprising:
    providing, to the neural network, training inputs comprising features related to electronic data items;
    receiving, from the neural network based on the training inputs, outputs indicating corresponding confidence scores generated by the machine learning model for a plurality of categories with respect to the electronic data items;
    comparing the outputs to labels associated with the training inputs;
    and iteratively adjusting parameters associated with nodes of the neural network based on the comparing until one or more conditions are met;

receiving, by the computing application from the machine learning model based on the inputs, confidence scores generated by the machine learning model for a plurality of categories with respect to the electronic data item;

automatically selecting, by the computing application, based on the confidence scores generated by the machine learning model for a plurality of categories with respect to the electronic data item not exceeding a categorization confidence score threshold and based on a distance between values of two of the confidence scores generated by the machine learning model for a plurality of categories with respect to the electronic data item, a question from a plurality of questions;

providing, by the computing application, the question for display via a user interface;

receiving, by the computing application, an answer to the question via the user interface;

generating, by the computing application, updated inputs to provide to the machine learning model based on the attributes of the electronic data item and the answer;

providing, by the computing application, the updated inputs to the machine learning model;

receiving, by the computing application from the machine learning model based on the updated inputs, updated confidence scores generated by the machine learning model for the categories with respect to the electronic data item;

and automatically categorizing, by the computing application, the electronic data item into a category of the one or more categories based on the updated confidence scores.

2. The method of claim 1, wherein the automatically categorizing is based on a confidence score of the updated confidence scores corresponding to the category exceeding the categorization confidence score threshold.

3. The method of claim 1, wherein the machine learning model has been trained based on respective attributes of historically categorized electronic data items of a plurality of users.

4. The method of claim 1, wherein the plurality of questions are associated with nodes of a decision tree.

5. The method of claim 1, further comprising providing, by the computing application, a recommendation of the category of the electronic data item for display via the user interface.

6. A method for automated categorization of electronic transaction records, comprising:

providing, by a computing application, inputs to a machine learning model based on attributes of an electronic transaction record, wherein the machine learning model is a neural network trained through a supervised learning process comprising:

providing, to the neural network, training inputs comprising features related to electronic transaction records;

receiving, from the neural network based on the training inputs, outputs indicating corresponding confidence scores generated by the machine learning model for a plurality of categories with respect to the electronic transaction records;

comparing the outputs to labels associated with the training inputs;

and iteratively adjusting parameters associated with nodes of the neural network based on the comparing until one or more conditions are met;

receiving, by the computing application, from the machine learning model based on the inputs, confidence scores generated by the machine learning model for a plurality of categories with respect to the electronic transaction record;

determining, by the computing application, that the confidence scores do not exceed a categorization confidence score threshold;

determining, by the computing application, based on the confidence scores generated by the machine learning model for a plurality of categories with respect to the electronic transaction record not exceeding the categorization confidence score threshold and based on a distance between values of two of the confidence scores generated by the machine learning model for a plurality of categories with respect to the electronic transaction record, a question related to the electronic transaction record;

providing, by the computing application, the question for display via a user interface;

receiving, by the computing application, an answer to the question via the user interface;

generating, by the computing application, updated inputs to provide to the machine learning model based on the attributes of the electronic data item and the answer;

providing, by the computing application, the updated inputs to the machine learning model;

receiving, by the computing application, from the machine learning model based on the updated inputs, updated confidence scores generated by the machine learning model for the categories with respect to the electronic transaction record;

determining, by the computing application, that a confidence score of the confidence scores corresponding to a category of the categories exceeds the categorization confidence score threshold;

and automatically categorizing, by the computing application, the electronic transaction record into the category based on the confidence score exceeding the categorization confidence score threshold.

7. The method of claim 6, wherein the category comprises an account in a chart of accounts associated with a user.

8. The method of claim 6, wherein the machine learning model has been trained based on respective attributes of historically categorized electronic transaction records of a plurality of users.

9. The method of claim 6, wherein the question is associated with a node of a decision tree.

10. The method of claim 6, further comprising providing, by the computing application, a recommendation of the category of the electronic transaction record for display via the user interface.

11. A system, comprising:

one or more processors;

and a memory comprising instructions that, when executed by the one or more processors, cause the system to:

provide, by a computing application, inputs to a machine learning model based on attributes of an electronic data item, wherein the machine learning model is a neural network trained through a supervised learning process comprising:

providing, to the neural network, training inputs comprising features related to electronic data items;

receiving, from the neural network based on the training inputs, outputs indicating corresponding confidence scores generated by the machine learning model for a plurality of categories with respect to the electronic data items;

comparing the outputs to labels associated with the training inputs;
and iteratively adjusting parameters associated with nodes of the neural network based on the comparing until one or more conditions are met;
receive, by the computing application from the machine learning model based on the inputs, confidence scores generated by the machine learning model for a plurality of categories with respect to the electronic data item;
automatically select, by the computing application, based on the confidence scores generated by the machine learning model for a plurality of categories with respect to the electronic data item not exceeding a categorization confidence score threshold and based on a distance between values of two of the confidence scores generated by the machine learning model for a plurality of categories with respect to the electronic data item, a question from a plurality of questions;
provide by the computing application, the question for display via a user interface;
receive, by the computing application, an answer to the question via the user interface;
generate, by the computing application, updated inputs to provide to the machine learning model based on the attributes of the electronic data item and the answer;
provide, by the computing application, the updated inputs to the machine learning model;
receive, by the computing application from the machine learning model based on the updated inputs, updated confidence scores generated by the machine learning model for the categories with respect to the electronic data item;
and automatically categorize, by the computing application, the electronic data item into a category of the categories based on the updated confidence scores.

12. The system of claim 11, wherein the machine learning model has been trained based on respective attributes of historically categorized electronic data items of a plurality of users.

13. The system of claim 11, wherein the plurality of questions are associated with nodes of a decision tree.

14. The system of claim 11, wherein the instructions, when executed by the one or more processors, further cause the system to provide, by the computing application, a recommendation of the category of the electronic data item for display via the user interface.

* * * * *